UNITED STATES PATENT OFFICE.

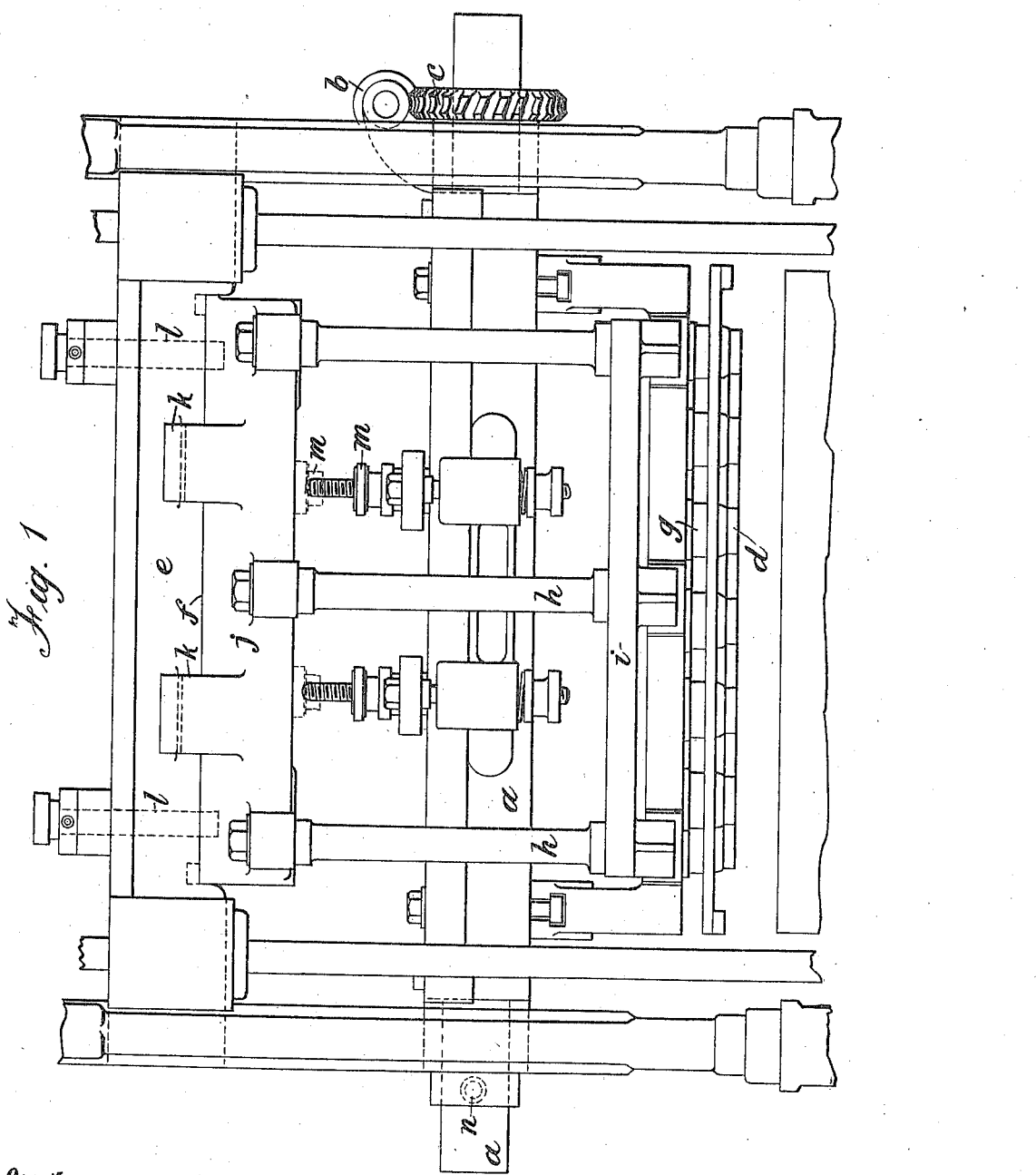

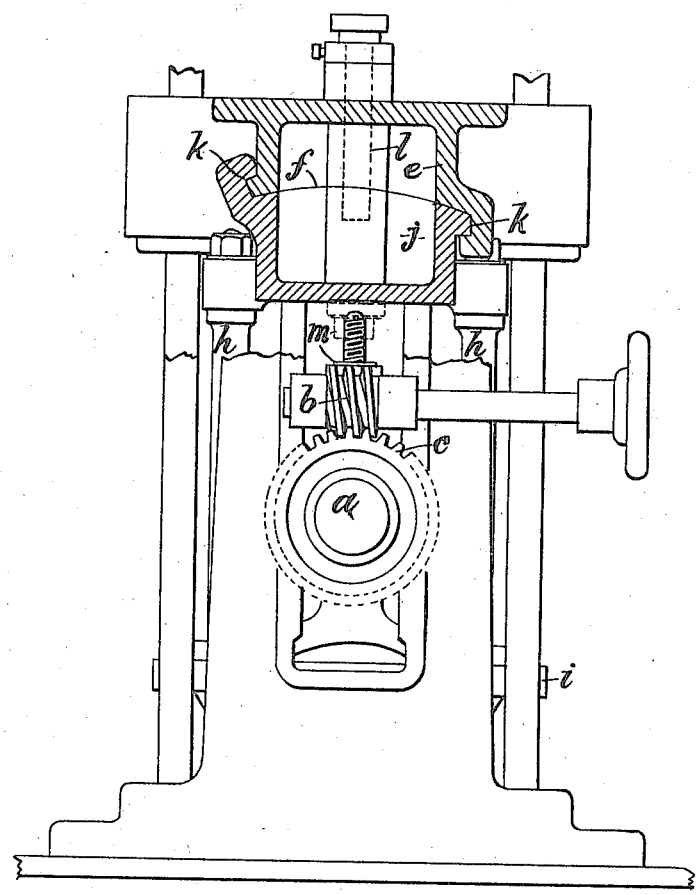

THOMAS VICARS, JOHN VICARS, AND EDWARD LYNTON VICARS, OF EARLESTOWN, ENGLAND.

BISCUIT-CUTTING MACHINE.

1,180,893.  Specification of Letters Patent.  Patented Apr. 25, 1916.

Application filed April 8, 1915.  Serial No. 19,897.

*To all whom it may concern:*

Be it known that we, THOMAS VICARS, JOHN VICARS, and EDWARD LYNTON VICARS, subjects of the King of Great Britain, residing at Earlestown, in the county of Lancaster, England, have invented new and useful Improvements in Biscuit-Cutting Machines, of which the following is a specification.

This invention relates to machines in which two reciprocating crossheads are used, one for the cutters and another for the embossers or ejectors.

When cleaning of the cutters is required it is a well known and convenient method in ordinary cutting machines to partially rotate the cutting crosshead and attachments on its axis. Hitherto this has not been possible with the embossing machines with the embossers connected to a separate cross head out of line with the cutter crosshead.

Our object is to provide simple means whereby the cutters and embossers may be rotated together when the usual separate crosshead is employed for operating the embossers.

The invention is hereafter described with reference to the accompanying drawings on which—

Figure 1 is a front view and Fig. 2 a side view partly in section of part of a biscuit cutting machine showing our improvements.

In carrying out the invention we make use of any convenient usual device for rotating the cutter crosshead $a$, for instance a worm $b$ and worm wheel $c$, and we connect the embossers $d$ to their crosshead $e$ by easily detachable joints $f$ so arranged that when the cutter crosshead $a$ is rotated the joints become detached, and the embossers $d$ and connections rotate with the cutters $g$. A convenient construction is, as shown, to attach the usual uprights $h$ from the embosser plate $i$ to a block or plate $j$ which is engaged with the embosser crosshead $e$ by a circular joint $f$ with recesses and projections $k$, the center of the circle being preferably at about the axis of the cutter cross head $a$ but a little to one side so that a wedge action is obtained at the joint to form a tight connection. Locking devices $l$ may be used if necessary to lock the block $j$ to the crosshead $e$. When the block $j$ is to be detached from the embosser crosshead $e$, it, or the embosser plate or connections, may be temporarily supported or attached to the cutter crosshead $a$ by running up the lock nuts $m$ of the usual ejector gear as shown in dotted lines until they bear against the block $j$; or catches or other locking devices may be used.

$n$ is a spring pin or catch engaging with the cutter crosshead $a$ to maintain it in proper cutting position.

We claim:—

1. In combination with the embosser crosshead and embossers of biscuit cutting and embossing machines, a block rotatable with the cutter crosshead and connected to the embossers and also connected to the embossing crosshead by a readily detachable joint device so arranged that on rotation of the cutter crosshead the joint device becomes detached from the embosser crosshead so as to allow the block and embossers to rotate with the cutters, substantially as set forth.

2. In biscuit cutting and embossing machines, in combination with a crosshead, cutters mounted thereon and means to partly rotate said crosshead to expose said cutters for cleaning purposes, embossers, a crosshead to operate said embossers, a block carrying said embossers and engaging the embosser crosshead, and means to rotatably disconnect said block from said crosshead.

3. In biscuit cutting and embossing machines, in combination with a crosshead, cutters mounted thereon and means to partly rotate said crosshead to expose said cutters for cleaning purposes, embossers, a crosshead to operate said embossers, a block carrying said embossers and engaging the embosser crosshead, said block being adapted to be disengaged from the crosshead by partial rotation, means to rotate the cutter crosshead and means to connect the block carrying the embossers with the cutter crosshead whereby both are rotated simultaneously.

In testimony whereof we have signed our names to this specification in the presence of two subscribing witnesses.

THOMAS VICARS.
JOHN VICARS.
EDWARD LYNTON VICARS.

Witnesses:
W. B. JOHNSON,
GEO. OWEN.

Copies of this patent may be obtained for five cents each, by addressing the "Commissioner of Patents, Washington, D. C."